(12) United States Patent
Gambill

(10) Patent No.: US 12,377,973 B1
(45) Date of Patent: Aug. 5, 2025

(54) FLIGHT CONTROL OF LIFT PLUS CRUISE QUADCOPTER AIRCRAFT

(71) Applicant: Doroni Aerospace Inc., Coral Springs, FL (US)

(72) Inventor: David Gambill, West Chester, PA (US)

(73) Assignee: Doroni Aerospace Inc., Coral Springs, FL (US)

( * ) Notice: Subject to any disclaimer, the term of this patent is extended or adjusted under 35 U.S.C. 154(b) by 13 days.

(21) Appl. No.: 18/612,132

(22) Filed: Mar. 21, 2024

Related U.S. Application Data

(63) Continuation-in-part of application No. 17/478,870, filed on Sep. 17, 2021, now Pat. No. 11,964,753.

(60) Provisional application No. 63/079,503, filed on Sep. 17, 2020.

(51) Int. Cl.
   *B64C 29/00* (2006.01)
   *B64D 31/16* (2024.01)

(52) U.S. Cl.
   CPC .......... *B64C 29/0025* (2013.01); *B64D 31/16* (2024.01)

(58) Field of Classification Search
   CPC ..... B64C 27/22; B64C 29/0025; B64C 27/10; B64C 27/20; B64C 39/08; B64D 27/24; B64D 31/16; Y02T 50/40; Y02T 50/60
   See application file for complete search history.

(56) References Cited

U.S. PATENT DOCUMENTS

| | | | | |
|---|---|---|---|---|
| 3,618,875 A * | 11/1971 | Kappus | ............... | B64C 29/0025 244/12.3 |
| 7,249,732 B2 * | 7/2007 | Sanders, Jr. | ........... | B64U 10/13 244/12.1 |
| 10,301,016 B1 * | 5/2019 | Bondarev | ............... | B64C 39/04 |
| 10,737,797 B2 * | 8/2020 | Murrow | ............. | B64C 29/0025 |
| 10,994,838 B2 * | 5/2021 | DeLorean | ............. | B64D 27/32 |
| 11,077,937 B1 * | 8/2021 | Bruell | .................... | B64C 11/001 |
| 11,142,309 B2 * | 10/2021 | Deslypper | .............. | B64D 27/33 |
| 2007/0018035 A1 * | 1/2007 | Saiz | ....................... | B64C 39/10 244/12.3 |
| 2012/0043413 A1 * | 2/2012 | Smith | ................. | B64C 29/0033 244/12.4 |
| 2013/0062455 A1 * | 3/2013 | Lugg | ....................... | B64C 39/12 244/12.3 |
| 2013/0251525 A1 * | 9/2013 | Saiz | .................... | B64C 29/0083 416/23 |
| 2015/0266571 A1 * | 9/2015 | Bevirt | ................ | B64C 29/0033 244/7 C |
| 2016/0244156 A1 * | 8/2016 | Leng | ......................... | B64C 1/26 |
| 2016/0244158 A1 * | 8/2016 | Fredericks | ................ | B64C 3/40 |
| 2016/0304193 A1 * | 10/2016 | Marcel | .................... | B64C 27/08 |
| 2017/0029131 A1 * | 2/2017 | Steinwandel | .......... | B64U 50/33 |
| 2018/0141652 A1 * | 5/2018 | Deslypper | ............. | B64C 39/12 |

(Continued)

*Primary Examiner* — Alentina Xavier
(74) *Attorney, Agent, or Firm* — James P. Demers; Cittone Demers & Arneri LLP

(57) ABSTRACT

An aircraft having two or more pairs of airfoils, each airfoil having an embedded vertical thruster, and provided with two horizontal thrusters, is described. The vertical thrusters provide sufficient lift to permit the aircraft to perform vertical takeoffs and landings, and the horizontal thrusters accelerate the aircraft to a speed at which the airfoils provide most or all of the lift required to maintain altitude. Methods of controlling the attitude and motions of the craft, via the conversion of a pilot's inputs into differential thruster speeds by a PID flight controller, are provided.

4 Claims, 8 Drawing Sheets

(56) References Cited

U.S. PATENT DOCUMENTS

2019/0112039 A1\* 4/2019 Pfaller .................... B64C 27/82
2019/0263515 A1\* 8/2019 Karem ..................... B64C 3/56
2021/0107667 A1\* 4/2021 Sinha ..................... B64D 31/06

\* cited by examiner

FLIGHT CONTROL OF LIFT PLUS CRUISE QUADCOPTER AIRCRAFT

RELATED APPLICATIONS

This application is a continuation-in-part of U.S. patent application Ser. No. 17/478,870 filed Sep. 17, 2021, now U.S. Pat. No. 11,964,753, which claims priority of U.S. Provisional Patent Application No. 63/079,503 filed on Sep. 17, 2020. The entire contents of these documents are incorporated herein by reference for all purposes.

FIELD OF THE INVENTION

The present invention relates to the field of multirotor vertical takeoff and landing (VTOL) aircraft, in particular to Lift Plus Cruise Electric VTOL aircraft.

BACKGROUND

Unmanned multicopter aircraft, in particular quadcopters, have become a common form of unmanned aerial vehicle (UAV), commercially available as battery-powered drones having sufficient lifting power to raise small loads, such as cameras for aerial photography. Larger versions, capable of carrying human operators and passengers, have recently been developed and are expected to see commercial sales and operation.

A common limitation of rotor-lifted aircraft is the consumption of a considerable amount of energy to maintain altitude, as all lift is provided by the motion of the rotors through the air. This limits the mass that can be lifted without the use of powerful engines and the fuel needed to operate them, which makes the craft noisy and far less fuel-efficient than conventional winged airplanes.

There is a need for quiet, electrically-powered VTOL aircraft, particularly in urban environments, but the energy demands of rotor-lifted craft are not met in a practical way by today's battery technology. Vertical Takeoff and Landing and Electric Vertical Takeoff and Landing (VTOL and eVTOL) vehicles designed to take off vertically like a helicopter, transition to fly like an airplane, and then transition back to land vertically like a helicopter, referred to as "lift plus cruise" aircraft, are promising solutions to the problems posed by flight in urban environments. However, these designs pose challenging handling and control problems, which must be addressed before safe and reliable urban operations can even be contemplated.

As an example, Boeing's V22 Osprey features wing-tip thrusters that rotate 90°, transitioning between a vertical lifting role to a horizontal acceleration role. Operation of the V22 during transitions between vertical and horizontal flight regimes presents control problems that highly-trained military pilots find challenging, even with computer-assisted flight and engine controls. Barring the development of aircraft with a larger envelope of safe operation, and completely automated takeoff and landing routines, such a design is unlikely to be suitable for commercial or private operation Winged VTOL aircraft having a separate propulsion system to power horizontal flight can avoid the difficult transition between vertical and horizontal flight, and make it possible to separately design the lifting and driving mechanisms. An early example is the Ryan XV-5 "Vertifan"; examples of later designs are found in U.S. Pat. No. 8,220,737 and the XV-58 "Manta" designed at Georgia Institute of Technology. Electric VTOL (eVTOL) aircraft having a separate propulsion system to power horizontal flight, with lift provided by wing-embedded fans during VTOL operation and by airfoils during horizontal flight, are presently under development; see, e.g., U.S. Patent Application Publication No. 2019/0308723.

As lift plus cruise vehicles transition between hover and forward flight, the vertical propulsion systems are typically used to compensate for the changing amount of lift produced by the wings by tilting, via vanes, and/or by speed control. Once sufficient airspeed is obtained, the wings produce all of the necessary lift, and the vehicles are controlled by manipulating traditional flight control surfaces.

VTOL vehicles suffer from slow maneuvering response times and instability at low speed and at hover. Their wings and tail of lift plus cruise vehicles make them even more susceptible to wind changes (e.g., due to gusts or changes in the vehicle's orientation with respect to the wind). As these vehicles transition between hover and forward flight, they encounter significant aerodynamic changes (e.g., the amount of lift produced by the wings and the amount of stabilizing pitch and yaw moments produced by the horizontal and vertical tail surfaces). As a result, the response of the vehicle to pilot inputs will change during the transition periods.

There is a need for control systems for lift plus cruise VTOL craft, for performing transitions between vertical and horizontal flight regimes and for carrying out hovering and landing tasks.

SUMMARY OF THE INVENTION

The present invention provides an aircraft that is lifted by four electrically-powered ducted rotors. Each of the ducted rotors comprises a pair of counter-rotating rotors, and is embedded within one of four airfoils. The embodiment presented here is capable of transporting one or two individuals in an enclosed cockpit, but the invention encompasses both smaller, "rideable" aircraft, and larger, multi-passenger embodiments. Battery and/or hybrid power sources may be employed.

Horizontal thrust is provided by two or more electric propellers mounted on the fuselage. After vertical takeoff, the horizontal thrusters accelerate the craft forward, and as the velocity increases the airfoils generate an increasing amount of lift. The lift required of the vertical thrusters (and the demand on the batteries) is correspondingly reduced, and in the limiting case, the craft smoothly transitions to an airplane mode of flight. In a preferred embodiment, the vertical thrusters are no longer required to maintain altitude, but they may continue to operate at a reduced output, where they provide supplemental lift and may also provide backup attitude control.

A feature of the present invention is the inherent resistance of the four-wing design to stalling. As the nose of the aircraft pitches up in flight, the lift provided by the fans in the forward pair of airfoils naturally decreases, and the aircraft returns to level flight. This takes place whether or not the craft is in the level flight regime. Another feature is that directional control (yaw), pitch and roll control are provided by manipulating the speed of the four fans, the rapid response of which to control inputs is made possible by their electric propulsion.

Routine control during level flight is greatly simplified by the absence of multiple control surfaces such as a vertical rudder, ailerons, and stabilizers. A set of flaperons on the forward airfoils may be provided for lift, and to serve as alternative/backup control devices. Additional flaperons on the rear wings may be provided in alternative embodiments.

It is also a feature of the aircraft of the invention that the wing-embedded fans are not closed off during level, wing-enabled flight, but remain open and operable so as to provide a means of control of yaw, pitch, and roll. In preferred embodiments, wing fences are provided alongside the fan openings, to limit spanwise flow of air away from the lifting surfaces and into the operating fans. The presence of such fences increase lift and reduce turbulence and drag. Suitable designs are disclosed in U.S. patent application Ser. No. 18/433,387 filed on Feb. 5, 2024, the entire contents of which are incorporated herein by reference for all purposes.

DETAILED DESCRIPTION OF THE INVENTION

Specific arrangements of the components of the invention are described below to illustrate the invention. These examples, and the accompanying drawings, are not intended to be limiting. The terms "fan" and "thruster" are used throughout to refer to both the lifting and forward propulsion mechanisms, and should be understood to encompass traditional propellers, rotors, and turbine devices. For clarity, method claims wherein the preamble recites "In an aircraft provided with . . . " are drafted for convenience and clarity, and are not an indication that the aircraft is found in the prior art.

I. Aircraft Design

Figure 1:
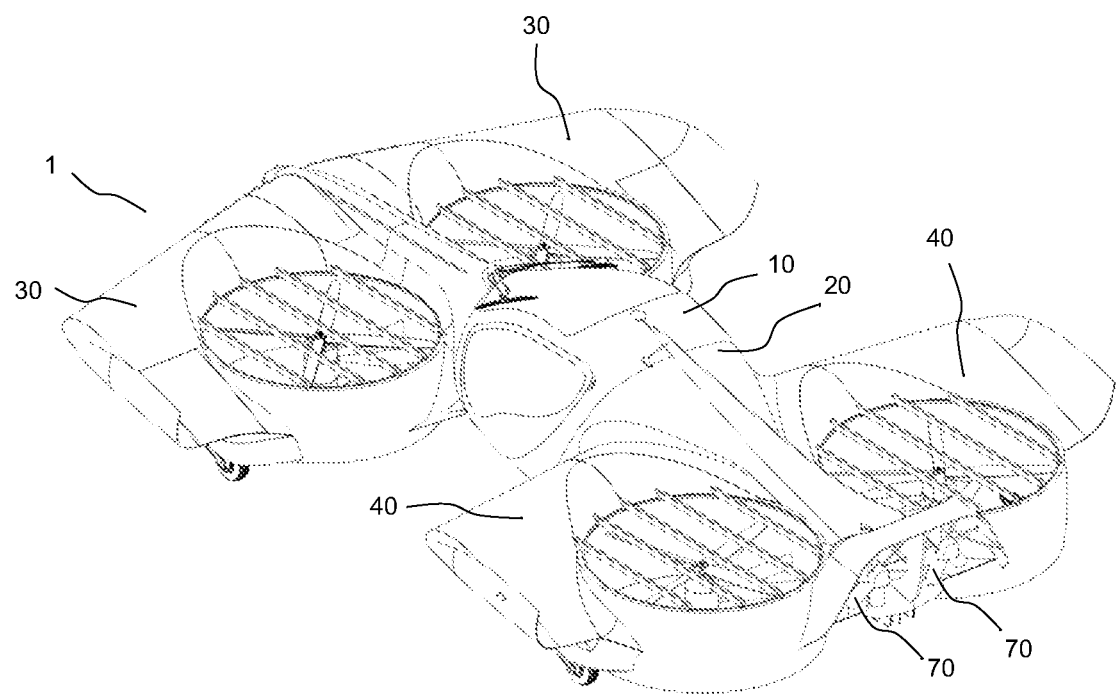
FIG. 1 is a perspective drawing of one embodiment of an aircraft of the invention.
Figure 2:
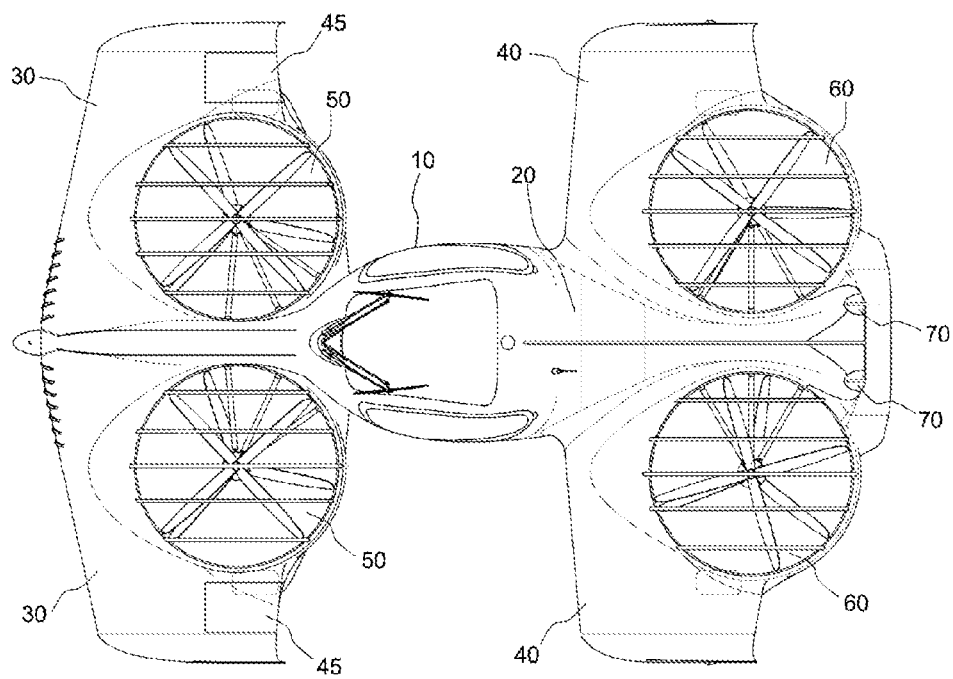
FIG. 2 is a top view of the aircraft of FIG. 1.

FIGS. 1 and 2 show, respectively, a perspective and top view of a representative aircraft 1 according to the invention. In FIG. 1 an enclosed cockpit 10 is integral to a fuselage 20, which has in this embodiment a pair of forward airfoils 30 and a pair of rear airfoils 40. In this embodiment, the forward airfoils are equipped with optional flaperons 45. The flaperons are used to increase the lift of the forward airfoil at low speeds, and at full flight speed to control roll and pitch of the craft. At sub-airplane speeds, roll and pitch are controlled by modulation of the vertical thrusters as described below.

The above airframe components may be constructed of any materials known to be suitable for aircraft, such as aluminum alloys and composite materials. Lightweight carbon composites are preferred.

Embedded in the airfoils are vertical thrusters 50 and 60. Alternative embodiments may have more than one thruster per airfoil, in order to provide the desired levels of fuel efficiency, carrying capacity, and redundancy. The vertical thrusters are preferably electrically-driven, counter-rotating fan blades or propellers, operating within a shroud. Electric, ducted-rotor thrusters are well-known in the art, and the invention does not rely on any particular design for operability. Suitable electric ducted fans (EDFs) and electric turbofans (ETFs) include but are not limited to the Athena™ line of ETFs from Neva Aerospace Ltd., Brighton, U.K.

For ease and economy of maintenance, all of the vertical thrusters are preferably of the same mechanical design. The use of counter-rotating blades, to eliminate aircraft control problems created by gyroscopic forces, is greatly preferred. The use of multiple off-axis fans, at a distance from the center of mass of the aircraft, eliminates the need for a collective to modulate blade pitch, which reduces weight and complexity. Power is provided by any suitable batteries; in alternative embodiments the battery capacity may be augmented by onboard fuel cells or a conventionally-powered generator.

The individual thrusters are preferably operated electronically, through coordinated instructions provided by an automatic flight control system as described further below. The computer-coordinated operation of multiple vertical thrusters by flight control software, originally developed by Niwa and Sugiura in 1987, is now well-known in the art, and can be carried out by commercially available software and hardware packages. Flight control through the computerized management of thrusters in quadcopters, in particular, is a well-developed technology.

Affixed to the fuselage are horizontal thrusters 70 oriented so as to provide forward thrust during level flight. Thrusters 70 are mounted in or close to the horizontal plane of the aircraft's center of gravity (or the expected center of gravity when loaded with passenger(s) and cargo), so as to limit any induced pitching moment when the thrusters are in use. The horizontal separation between the thrusters 70 is at least sufficient to enable yaw control, as discussed below. Thrusters 70 provide sufficient forward airspeed to permit operation as a "fixed wing" aircraft, reducing or eliminating reliance on the vertical thrusters. Since fixed wing aircraft are more fuel efficient than helicopters or multirotor aircraft, transitioning from vertical to less powerful horizontal thrusters reduces energy consumption and increases flying time for a given amount of fuel or battery charge.

The thrusters 70 may be operated differentially, providing a yaw moment that can be used to control the aircraft's orientation and direction. This reduces or eliminates the need for a rudder, and as with the vertical thrusters, is enabled by direct electronic control of the rotor speeds. As with the vertical thrusters 50 and 60, the horizontal thrusters 70 rely on well-established and commercially-available pusher-prop technology. Preferred embodiments include ducted-fan and shrouded-propeller thrusters.

Figure 3:
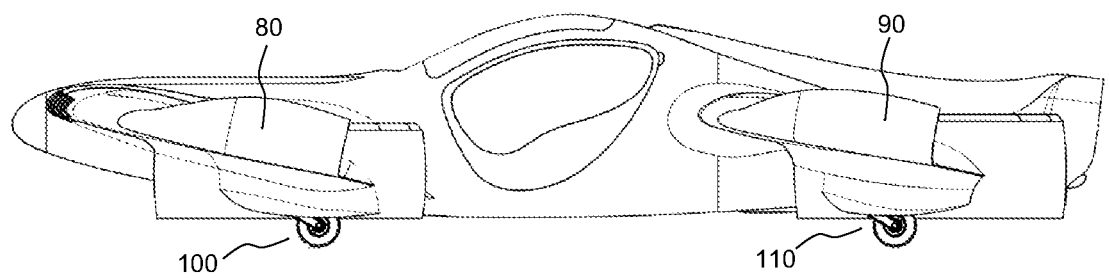
FIG. 3 is a side view of the aircraft of FIG. 1.

FIG. 3 is a side view of the same embodiment. The tips of the forward and rear wings are equipped with winglets 80 and 90, respectively. As is known in the art, winglets serve to reduce drag by reducing vortex formation at the wingtips. Forward and rear landing gear 100 and 110 are preferably shock-mounted wheels, as shown, for ease of moving on the ground or into a hangar or garage. Skids, skis, floats, and the like may be used in alternative embodiments, as is known in the art.

A feature of the invention, illustrated in FIG. 3, is that the attack angle of the forward airfoil 30 (13° in this embodiment) is slightly greater than the attack angle of the rear airfoil 40 (10° in this embodiment.) This provides slightly greater lift at the forward airfoil 30 at all airspeeds, and the center of gravity of the craft as a whole is preferably located sufficiently forward to compensate, so as to provide neutral lift in horizontal flight. This is most conveniently achieved via appropriate placement of the batteries. To the extent that the craft, together with the passenger(s) and cargo, present a center of gravity that is not at the center of lift of the two airfoils, the flaperons (and optionally the forward and rear vertical thrusters) are operated so as to compensate.

The greater angle of attack of the forward airfoil 30 has the effect of causing the forward airfoil to stall at a higher speed than does the rear airfoil. Thus, as the craft approaches stall conditions through loss of airspeed and/or an increase in upward pitch, the forward airfoil 30 will be the first to stall. The angle of attack of the forward airfoil 30 is between 1° and 8° greater than that of the rear airfoil 40, preferably between 2° and 5° greater, and more preferably 3-4° greater.

As can also be seen in FIG. 3, where the vertical thrusters are embedded in the airfoils, the upper surfaces of the airfoils aft of the point of maximum camber are angled downward significantly, so as to direct laminar flow over the wing into the intakes of the thrusters. This supply of compressed air improves the efficiency of the thrusters and increases the provided lift as the craft accelerates forward. The thruster shrouds project below the lower surface of the airfoils, directing laminar flow away from the thrusters, thereby minimizing interaction of the thrusters with the airflow across the lower surfaces.

If the craft is allowed to nose up dangerously while partially supported by the thrusters (e.g. when transitioning from VTOL to level flight operation), as the forward airfoils 30 approaches stall conditions, the laminar airflow across the top of the forward airfoils begins to separate and flow turbulently. This disrupts the airflow into the forward thrusters 50, reducing the lift being provided, and causing the nose of the craft to nose back down until lift is restored. The rear airfoils 40, having a lower attack angle, maintain laminar flow and the rear thrusters 60 do not lose lift. This anti-stall mechanism operates at any forward speed that generates laminar flow, and is in addition to the known function of canards in conventional aircraft, which prevent stalls at flight speed via loss of lift from the canards themselves.

For vertical landing, the vertical thrusters are engaged to provide lift as the airspeed decreases, and are fully engaged when the airfoils cease to provide lift. The horizontal thrusters 70 are then used as needed to position the craft for vertical landing.

Figure 4:
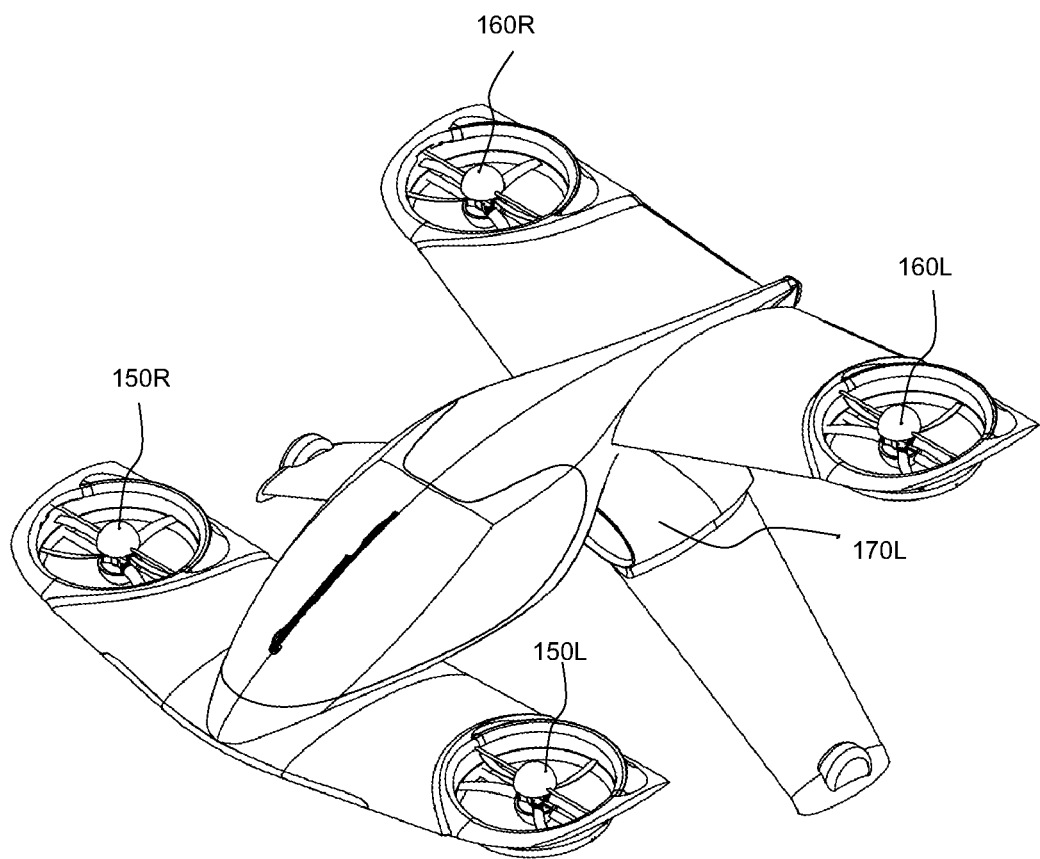
FIG. 4 is a perspective drawing of a second embodiment of an aircraft of the invention.
Figure 5:
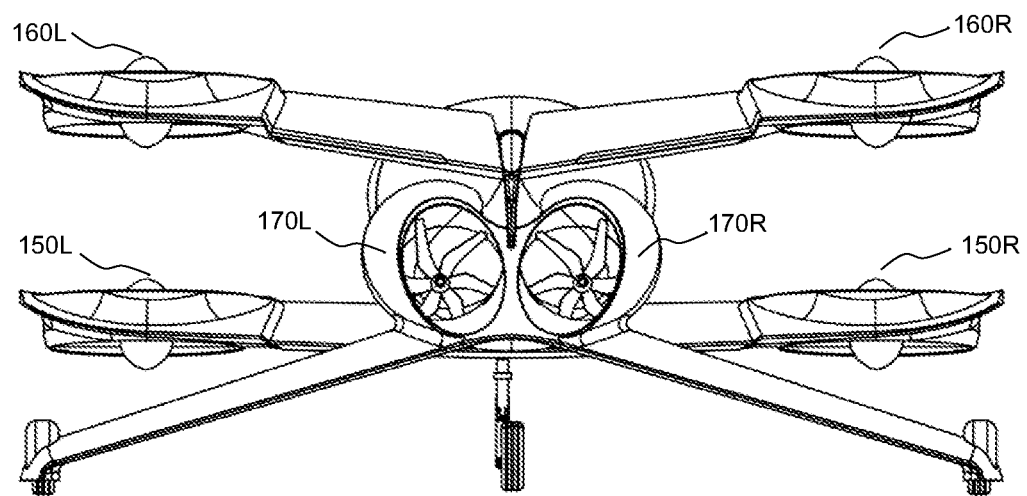
FIG. 5 is rear view of the aircraft of FIG. 4.

FIGS. 4 and 5 are perspective and rear views, respectively, of an alternative embodiment of an aircraft of the invention, having forward lift fans 150L and 150R, and rear lift fans 160L and 160R, installed at the wingtips. As is conventional in quadcopter designs, diagonally-opposite fans 150L and 160R rotate in one direction, while fans 150R and 160L rotate in the opposite direction, so as to avoid the creation of net torque and gyroscopic effects. In this embodiment, the counter-rotating forward thrusters 170L and 170R are larger and more widely separated. The greater separation increases the torque available for yaw control, as described further below. Unequal speed changes in the forward thrusters will induce a roll moment to the craft due to their angular momentum, and in order to combine this with the induced yawing moment in a banked turn, thruster 170L preferably rotates counter-clockwise, and 170R rotates clockwise, when viewed from the rear of the craft.

The flight control system comprises one or more central flight controller processors, in operating communication with volatile and non-volatile computer storage. The non-volatile (non-transient) storage may be a computer-readable medium such as a hard drive or, preferably, solid-state flash memory such as an SSD, and stores machine-readable instructions, including the flight control software, for execution by the processor(s). The processor(s) are coupled to various input/output (I/O) devices for receiving input from various sensors, input from the pilot, and for providing output to cockpit displays, the thruster controllers, and control surfaces. The operation of the central flight controller processor(s) and software is discussed in detail below. Human interface devices may include digital readouts and analog dials, touch screens, heads-up displays, sticks and pedals, as are typical of modern VTOL aircraft.

The sensors include but are not limited to gyroscopes, accelerometers, tilt sensors, altimeters, GPS devices, Lidar, optic-flow cameras, infrared, ultrasonic and inertial guidance devices for detection of aircraft orientation and location; tachometers, current and voltage sensors, and thermocouples for detection of thruster operating conditions, and current, voltage and temperature sensors adapted to monitor the condition of the batteries. Electromechanical sensors and strain gauges can be used to monitor control surface positions and dynamic and static loads at key structural elements. Commercially available motion detection and processing units, comprising a 3-axis gyroscope and a 3-axis accelerometer on a single chip, together with a processor capable of processing the sensors' outputs into a computer-comprehensible digital signal, may be combined into a single Inertial Measurement Unit (IMU), and are particularly preferred.

A suite of navigation instruments, as are known in the art, is preferably installed in the cockpit, and may interface with the flight control system. In some embodiments a pre-planned flight may be stored in non-volatile memory, and used by the processor to control flight. Communication with satellite or ground-based receivers may be provided, whereby flight data and aircraft conditions are automatically uploaded for later evaluation, digital maintenance records, and performance review.

The flight control software is configured, as is known in the art, to convert pilot control inputs into appropriate commands to the thruster motors and flaperons. Certain operations, such maintenance of trim, airspeed, and altitude at pilot-selected setpoints, may be automated. Optimum energy efficiency may be automatically maintained by adjustment of the aircraft's operating parameters. Preferably, the pilot is provided at all times with the present battery charge, power consumption, and remaining flight time and range under the present operating conditions. Optionally, data may be provided to a pilot's laptop, tablet or cell-phone via onboard wireless (e.g., Wi-Fi, Bluetooth, or NFC) communication, for display via an installed application. For security, the flight control system may be configured so that the presence of a specific wireless device is essential to operation of the craft.

In the event of an in-flight loss of lift or control, the craft is preferably provided with an emergency parachute system capable of delivering the craft to the ground without injury to pilot or passengers. Such systems are known in the art and are a commercially available option on small aircraft. Interior air bags are provided, which deploy upon detection of an impact, and preferably, the controlled deformation of the landing gear and/or elements of the internal airframe will absorb and dissipate the energy of a crash. Appropriate technologies and materials, developed by the automobile industry, are well known and are readily adaptable to personal aircraft.

II. Aircraft Control—Attitude and Maneuvering

Methods of controlling the motion and attitude of a typical radio-controlled quadcopter are well-established. The operator typically inputs commands via a pair of joysticks. The left stick is commonly a "throttle", controlling the speed and therefore the lift of all four propellers when pushed forward or backward, and also a "rudder" for inducing turns (yaw) to the left or right. The right stick controls the tilt of the drone, i.e. the pitch and roll. In "Mode 1" the commanded movements are made relative to the operator standing on the ground; in "Mode 2" the commanded movements are made relative to the drone, as if the operator were piloting the craft.

All of the above "simple" pilot commands are implemented via proportional and coordinated control of the four lifting propellers. Forward acceleration is obtained by pitching the craft nose-down, so provide the lifting force of the propellers with a forward vector component. Motion in other directions is accomplished in a similar manner: tilting (rolling) to the left or right is effected by slightly lowering the speed of the fans on the side of the craft one wishes to lower, relative to the fans on the opposite side. Rotation (yaw) of the craft is accomplished by slowing diagonally-opposite propellers, which in a quadcopter are spinning in the same direction. The reduced angular momentum of the propellers is compensated for by the craft acquiring angular momentum in the opposite direction. The other two propellers, which are counter-rotating, are simultaneously accelerated, compensating for the loss of lift and further contributing to the desired change in angular momentum of the craft.

The translation of the operator's commands into the above-described coordinated alterations of the speed of the four independent motors is carried out by a central flight controller, which receives the joystick commands and also takes information from an Inertial Measurement Unit (IMU) and a GPS module. An obstacle detection sensor may be present, and the controller will take inputs from that sensor as well. The controller carries out the necessary computations, using programmed flight parameters and algorithms, to convert the operator commands into motor speed instructions, and sends the resulting outputs to the motors' electronic speed controllers.

Control of the aircraft during level flight, transitions between horizontal and vertical flight regimes, and maneuvering during takeoff and landing, may all be implemented with programmed flight parameters and task-specific algorithms.

An aircraft of the present invention, similarly having four fans rotating in a similar relationship to one another, is subject to being controlled in the same general manner. However, the design of an electrically-powered craft with the capacity to lift passengers and cargo requires extensive use of light-weight materials and weight reduction technologies. This, combined with the need for rapid fan speed response to the electronic speed controllers, requires that the fan blades in particular be made as lightweight as possible. As a result, the angular momenta of the rotating fans are considerably reduced relative to the rotational inertia (moment of inertia) of the aircraft as a whole; this leads to a relatively slow response to the yaw control inputs described above. An additional complication arises as the craft transitions to horizontal, wing-supported flight: the reduced need for lift calls for a corresponding reduction in fan speed, resulting in a reduction in fan angular momentum and, again, a lowered response to the usual yaw control inputs. The resulting lack of consistent response to control inputs would make piloting such a craft extremely difficult.

These problems are solved by the present invention, using a flight controller that employs speed control of the forward propulsion fans in order to provide yaw control. In preferred embodiments, the flight controller dynamically compensates for variations in yaw response occasioned by changes in forward thrust settings.

FIGS. 6-13 illustrate the changes in motor speed and thrust that are used in the invention to control the attitude and motion of the craft of FIGS. 4-5. In the drawings, a black upward arrow indicates higher thrust and a white downward arrow indicates lower thrust. Stripe-patterned arrows, used in connection with the forward thrusters, indicate a stopped, feathered, or idling condition, and a change in the right forward thruster 170R (not visible in the drawings) is shown only if it differs from that in the left thruster 170L. The terms "higher" and "lower" do not reference a fixed value, but indicate a change in motor speed and thrust relative to the speed and thrust in effect prior to initiation of the described maneuver.

Figure 6:
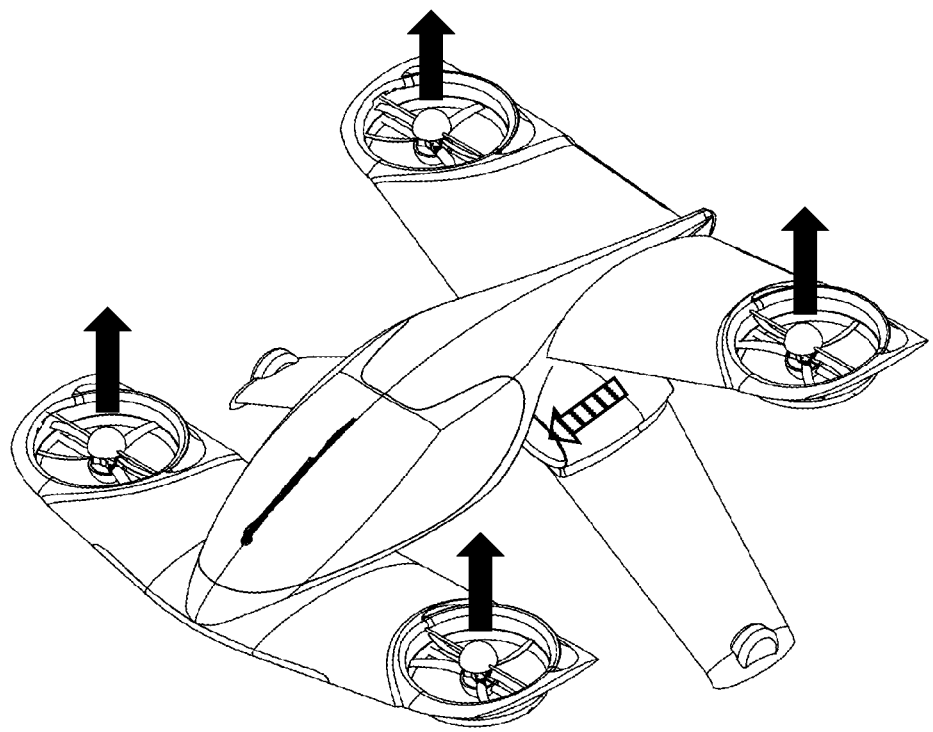
FIG. 6 illustrates control of the output of the fans during hovering.

FIG. 6 shows the result of a command for vertical rise. All four lift fans are given an equal increase in speed, while the forward thrusters are at idle. When a stationary hover is commanded by the pilot, the fans are slowed just enough to maintain a constant altitude.

Figure 7:
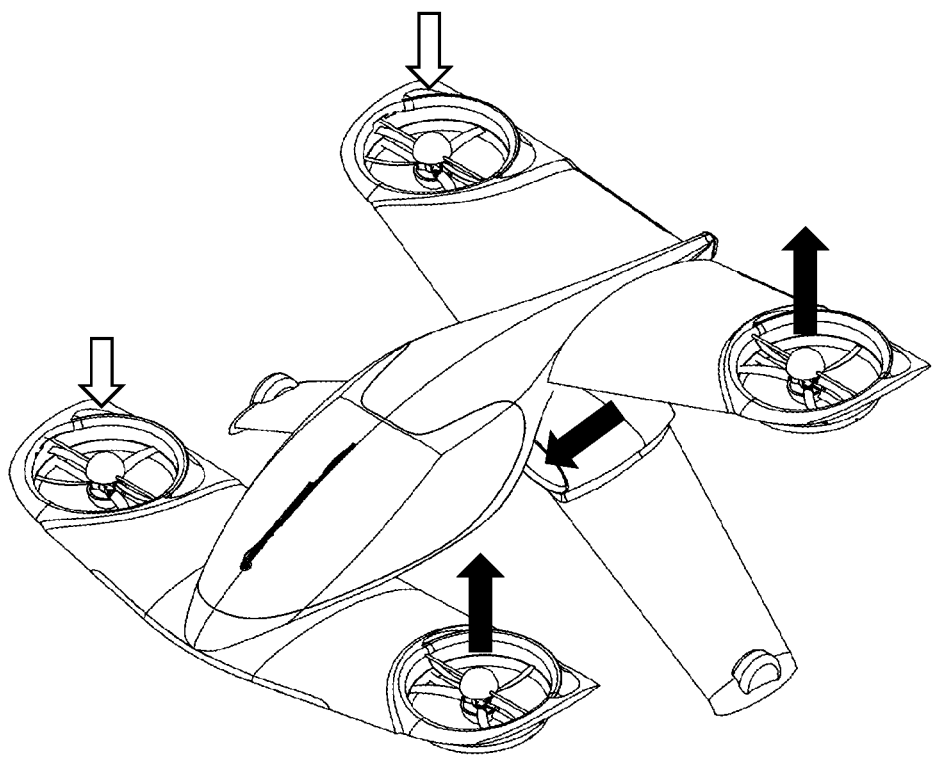
FIG. 7 illustrates control of the output of the fans to effect a roll to the right.

FIG. 7 shows the result of a command for a roll to the right during horizontal flight. Left-side fans 150L and 160L are given increased speed, while right-side fans 150R and 160R are given a relative decrease in speed. To maintain altitude, both forward thrusters are given an increase in speed, to gain a compensating amount of lift. The controller takes the airspeed into consideration when computing the needed fan speeds. For example, when wing lift is reduced due to a slower airspeed, a compensating amount of lift is provided by higher fan speeds all around, i.e. the controller provides less of a decrease to the left side fans, and more of an increase to the right side fans. This principle is applied to all maneuvers and attitude adjustments that require compensating changes to the total lift.

Figure 8:
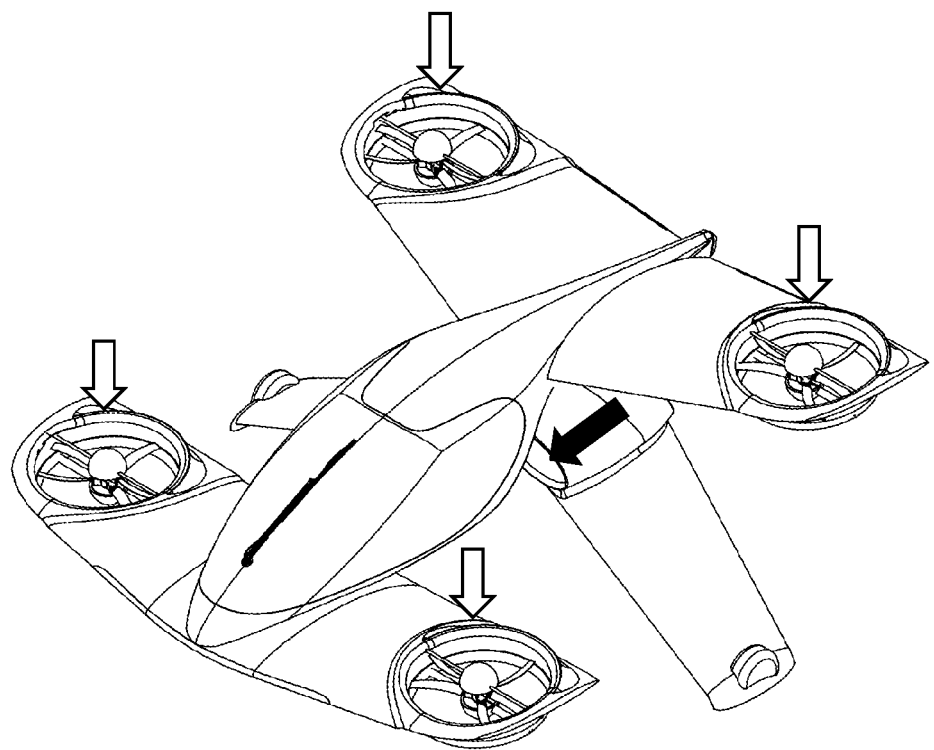
FIG. 8 illustrates control of the output of the fans to effect level forward flight.

FIG. 8 shows the result of a command to transition from hover to forward flight. As expected, both forward thrusters are given an increase in speed. The four lifting fans are gradually decreased in speed as the craft accelerates and the wings gain lift, i.e., the controller again takes the airspeed into consideration when computing the needed fan speeds.

Figure 9:
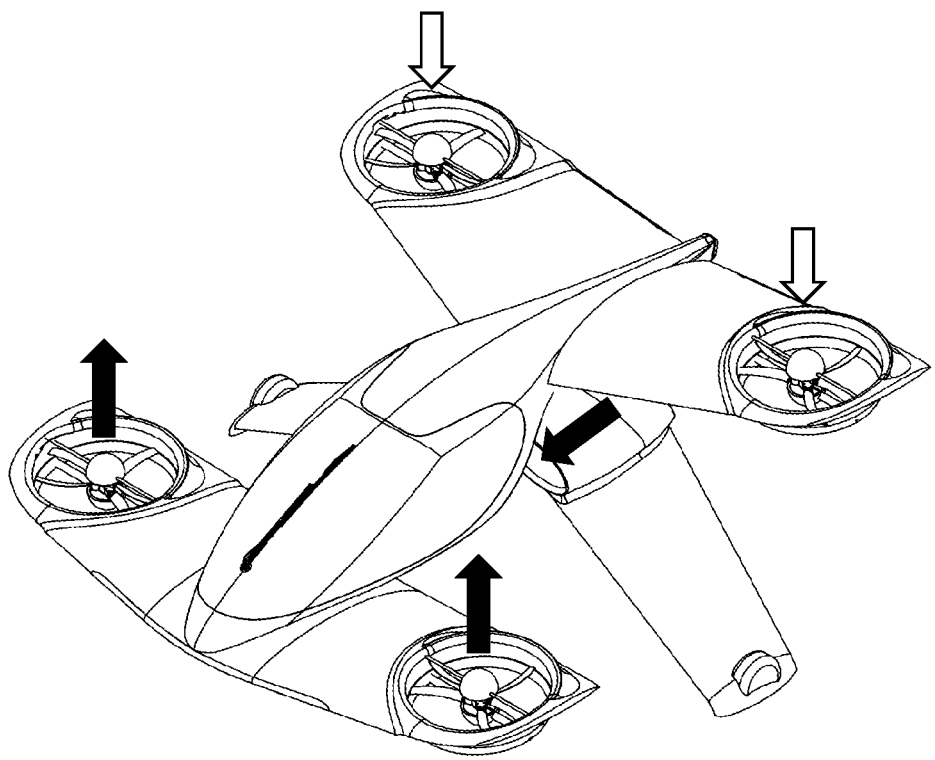
FIG. 9 illustrates control of the output of the fans to effect ascending forward flight.

FIG. 9 shows the result of a command for ascent during forward flight. The rear lift fans are slowed relative to the forward fans, so as to provide a pitch-up moment, and the forward thrusters are increased in speed to gain lift from the wings. At lower airspeeds, less pitch-up and greater fan lift is provided; in the limiting case of zero airspeed the commanded fan speeds are as in FIG. 6.

Figure 10:
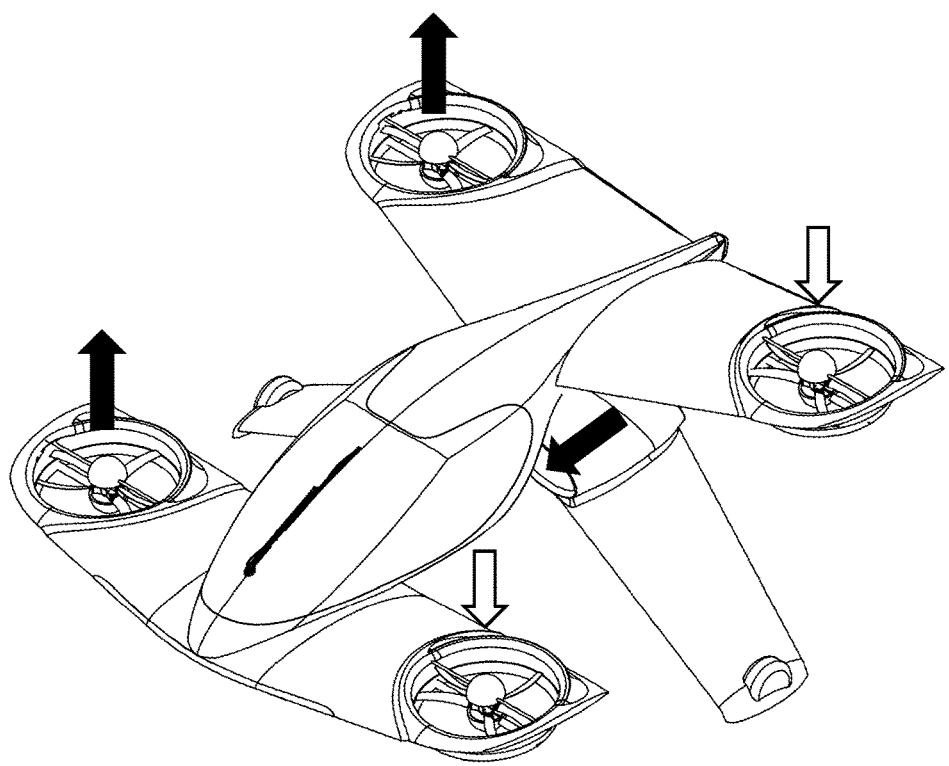
FIG. 10 illustrates control of the output of the fans to effect a roll to the left.

FIG. 10 shows the result of a command for a roll to the left. This is a mirror image of the fan speed commands shown in FIG. 7: Left-side fans 150L and 160L are given decreased speed, while right-side fans 150R and 160R are given a relative increase in speed. Forward thruster speed and airspeed compensation are as described for FIG. 7.

Figure 11:
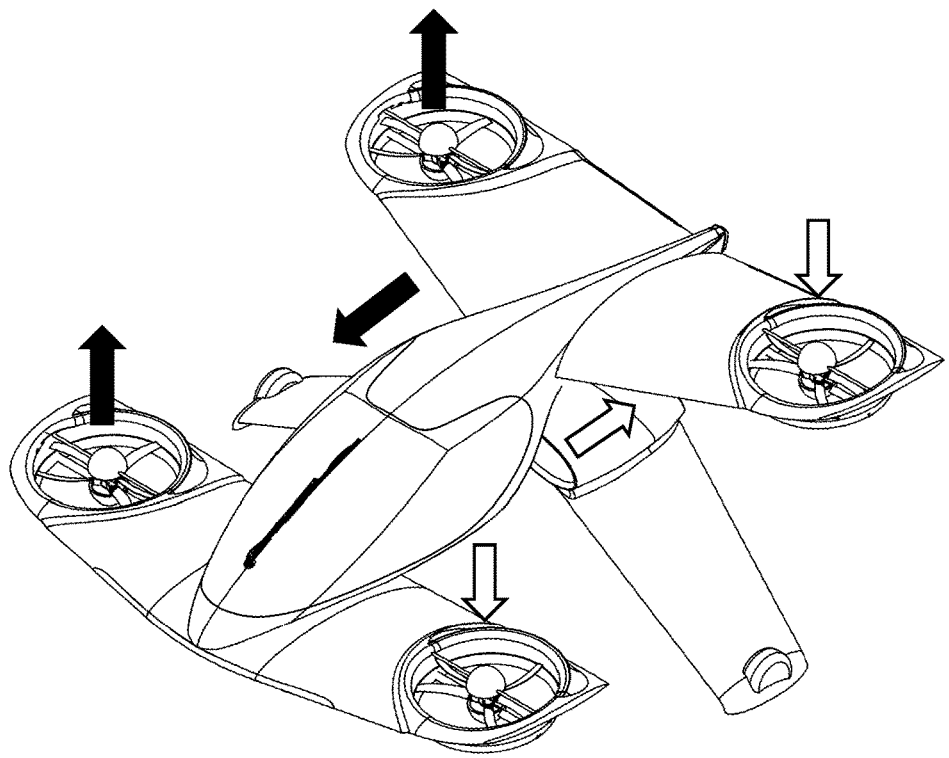
FIG. 11 illustrates control of the output of the fans to effect a turn to the left.

FIG. 11 shows the result of a command for a turn to the left. Right forward thruster 170R is given an increase in speed relative to left thruster 170L, in order to generate a yawing moment to the left. During forward flight, to prevent entering a stall or flat spin, it is necessary to bank a winged craft sufficiently to induce a give the lift vector a sideways component; this changes the direction of travel so as to keep the craft pointed into the airflow. Although the lifting fans make a craft of the invention capable of a flat, skidding turn, passengers and cargo will be more secure if the craft is banked sufficiently to compensate for the centrifugal force induced by the turn. This is provided by a rolling motion described for FIG. 10. Airspeed, and inputs from the accelerometers, is factored into the controller's computation of the required amount of banking.

Figure 12:
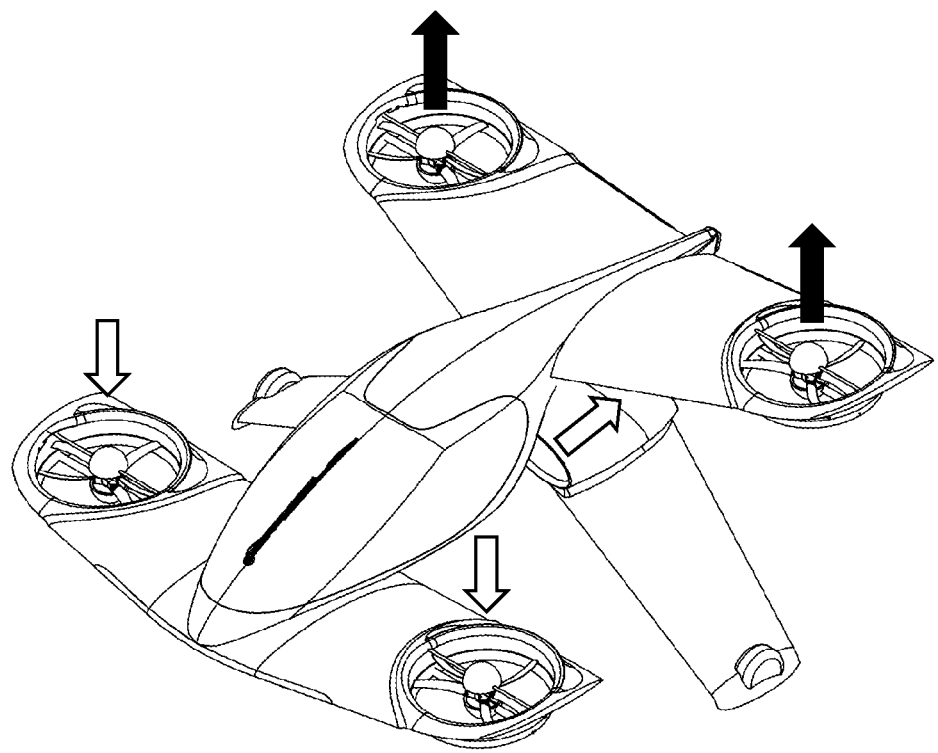
FIG. 12 illustrates control of the output of the fans to effect descending forward flight.

FIG. 12 shows the results of a command for descent during level flight. The rear fans are given a greater speed relative to the front fans, producing a pitch down moment, and the forward thrust is increased. In a nose-down attitude, there is a downward component to the thrust vector, and the craft descends accordingly. Airspeed is taken into account by the controller in computing the necessary fan speeds, so that in the limiting case of zero forward speed all four fans are equally slowed, inducing a vertical descent.

Figure 13:
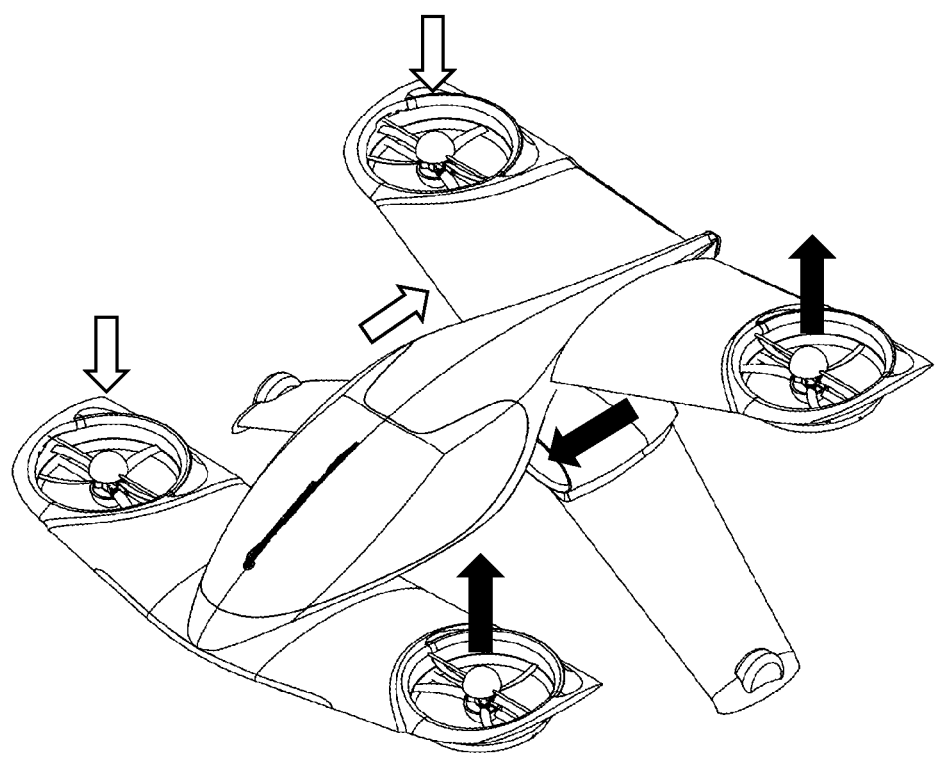
FIG. 13 illustrates the output of the fans to effect a turn to the right.

FIG. 13 shows the result of a command for a turn to the right. Left forward thruster 170L is given an increase in speed relative to right thruster 170R, in order to generate a yawing moment to the right. Compensation for airspeed and centrifugal forces are the same as described above for FIG. 11.

Using the above methods of attitude control, in combination, the flight control software converts the maneuvering commands of the pilot into the appropriate commands to the thrusters, so as to execute the desired maneuvers. Thus, the software (i) alters the speed of the vertical thrusters within the airfoils on the left side of the craft, relative to the speed of the vertical thrusters within the airfoils on the right side of the craft, when the pilot commands that a roll moment be imparted to the craft; (ii) alters the speed of the vertical thrusters within the first pair of airfoils, relative to the speed of the vertical thrusters within the second pair of airfoils, when the pilot commands that a pitching moment be imparted to the craft; and (iii) alters the relative speed of the horizontal thrusters when the pilot commands that a yawing moment be imparted to the craft.

When the pilot commands a banking turn to the left or right, the software simultaneously performs operations (i) and (iii) so as to effect the desired change in direction of horizontal flight.

At all times during horizontal flight, the software simultaneously alters the speed of all four vertical thrusters, relative to the speed of the horizontal thrusters, so as to maintain constant lift during acceleration or deceleration of the forward flight of the craft. The speed of the vertical thrusters is also varied as a function of airspeed, so that the total lift provided by the thrusters and the airfoils is constant during level flight. Maneuvers that call for decreased thrust in any of the vertical thrusters are also compensated for by the software when the pilot is not commanding a change in altitude.

The above-described computations of induced forces and compensations will be based on stored profiles and algorithms based on the flight characteristics of the craft. Correction factors for the actual weight of the craft, windspeed, and air density (temperature and altitude) are preferably applied. It is preferred that feedback from the IMU is constantly evaluated and compared to the expected motion and attitude of the craft, using a proportional-integral-derivative (PID) software design to compare desired setpoints to measured variables. Adaptive control programming is preferred; this enables the controller to adjust the parameters used to calculate the expected response to command inputs.

Such programming is known for use in quadcopter controllers (see R. I. Perez et al., "Attitude Control of a Quadcopter Using Adaptive Control Technique" in *Adaptive Robust Control Systems*, L. A. Tuan, ed., IntechOpen (2017) Ch. 6; DOI: 10.5772/intechopen.71382), and is well-suited to the unique yaw control methods and horizontal flight parameters used by the present invention.

Although the invention as illustrated and described herein is embodied in specific examples, it is not intended to be limited to the details shown. Various modifications, substitutions and structural and programming changes, which will be apparent to those skilled in the art, can be made without departing from the spirit of the invention. Unless explicitly disclaimed, such equivalents and substitutes are intended to fall within the scope of the appended claims. Accordingly, it is intended that the appended claims be construed broadly and in a manner consistent with the true scope of the invention.

I claim:

1. In a VTOL aircraft capable of horizontal wing-supported flight, comprising:
    a) a fuselage having forward, central, and aft portions;
    b) a first pair of airfoils joined to the forward portion of the fuselage;
    c) a second pair of airfoils joined to the aft portion of the fuselage;
    d) a cockpit integral to the central portion of the fuselage;
    e) two horizontal thrusters, parallel and mounted in the horizontal plane of aircraft; and
    f) four vertical thrusters, each fixedly embedded within each one of the airfoils; a method of horizontal flight control comprising:
        (i) altering the speed of the vertical thrusters within the airfoils on the left side of the craft, relative to the speed of the vertical thrusters within the airfoils on the right side of the craft, so as to impart a roll moment to the craft;
        (ii) altering the speed of the vertical thrusters within the first pair of airfoils, relative to the speed of the vertical thrusters within the second pair of airfoils, so as to impart a pitching moment to the craft;
        (iii) altering the relative speed of the horizontal thrusters so as to impart a yaw moment to the craft;
        (iv) simultaneously performing operations (i) and (iii) so as to change the direction of horizontal flight; and
        (v) simultaneously altering the speed of all four vertical thrusters, relative to the speed of the horizontal thrusters, so as to maintain constant lift during acceleration or deceleration of the forward flight of the craft.

2. The method of flight control according to claim 1, wherein the vertical and horizontal thrusters are electrically powered, and the relative speeds of the vertical and horizontal thrusters are regulated by speed controllers under the control of flight control software running on a central flight controller.

3. The method of flight control according to claim 2, wherein the flight control software is proportional-integral-derivative (PID) flight control software.

4. The method of flight control according to claim 3, wherein the PID flight control software is adaptive flight control software.

* * * * *